United States Patent Office 3,048,471
Patented Aug. 7, 1962

3,048,471
ALKALI METAL POLYPHOSPHATOSULFATES
AND PREPARATION THEREOF
Kenneth J. Shaver, Stoneham, Mass., assignor to Monsanto Chemical Company, St. Louis, Mo., a corporation of Delaware
No Drawing. Filed Nov. 15, 1956, Ser. No. 622,261
20 Claims. (Cl. 23—106)

This invention relates to the production of novel heteropolymeric inorganic compositions and to the methods of preparing same. More specifically this invention relates to the production of polystructures which resemble the polyphosphates wherein one or more of the $PO_4$ tetrahedra are replaced by one or more of the $SO_4$ tetrahedra, which copolymers are polyphosphatosulfates.

It is the principal object of this invention to provide a novel class of compositions containing an alkali metal, phosphorus, sulfur and oxygen which can be defined by the formula $xM_2O \cdot yP_2O_5 \cdot zSO_3$ wherein M is an alkali metal and the ratio of $x$ to $y$ plus $z$ is less than one. Another object of this invention is to provide a simple means of producing the aforesaid alkali metal polyphosphatosulfate compositions by effecting the fusion of a mixture wherein the ratio of $x$ to $y$ plus $z$ is less than one and thereafter chill cooling the melt. Other objects will be apparent to those skilled in the art in view of the following disclosure.

It has now been found that critical control of the reactants such that the molecular ratio of the $M_2O$, wherein M is an alkali metal, preferably sodium or potassium, to the sum of the $P_2O_5$ and $SO_3$ is less than one and the system is raised to a sufficient temperature under conditions which will effect a melt or fusion of the reactants will produce the novel alkali metal polyphosphatosulfate compositions of this invention. In general it is preferred that the aforesaid molecular ratio of $M_2O$ to the sum of $P_2O_5$ and $SO_3$ is at least about 0.4 and more preferably still the said ratio is from about 0.55 to about 0.9.

The alkali metal polyphosphatosulfates can be prepared by several related methods all of which embrace the treatment of a mixture selected from the group consisting of alkali metal phosphates, alkali metal sulfates and the acid anhydrides phosphorus pentoxide and sulfur trioxide in accordance with the aforesaid requirements. After the reaction mixture is heated to the melting point the melt is rapidly cooled to provide a glassy product which can be readily sized by any suitable means as required by the end use of the particular product.

One suitable method for the preparation of the polyphosphatosulfates entailed heating the selected phosphate salt, e.g. sodium tripolyphosphate, tetrasodium pyrophosphate and the like, to about 100° C. and treating the said salt with gaseous anhydrous sulfur trioxide in a closed system whereby the gaseous sulfur trioxide is absorbed by the salt. The exothermic heat of reaction is normally sufficient to cause the mixture to melt where heat losses are substantially avoided. In the event that the processing conditions prevent a sufficient build-up of temperature in this manner the mixture is brought to a clear, free-flowing melt at about 400° to about 450° C. by providing heat from an external source. The melt is then chill cooled and solidifies to a clear glass.

The aforesaid use of gaseous sulfur trioxide is not easily controlled as to the extent of the sulfur trioxide which is absorbed into the phosphate salt. A substantially accurate control of the addition of the sulfur trioxide can be effected by the use of anhydrous liquid sulfur trioxide wherein it is added slowly directly to the dry phosphate salt in a closed and vented vessel at a temperature of from about 25° to about 50° C., or higher but less than 100° C., with constant agitation to produce a dry, free-flowing composition which is then heated to its melting point of above about 400° C. and subsequently chill cooled.

The aforesaid method of preparation of the polyphosphatosulfate compositions also suffers from several limitations in that the dry powder fumes strongly when large amounts of sulfur trioxide are added and this system is not adaptable to vary the $Na_2O:P_2O_5$ ratio which is fixed by the particular choice of phosphate salt employed. These limitations can be removed by the use of a suitable mixture of phosphate and sulfate salts to which phosphorus pentoxide is added to provide the ultimate desired ratio of $Na_2O:P_2O_5:SO_3$. The three-component system can be readily prepared to provide a uniform, dry mixture which is then heated to the melting point and chill cooled to provide the polyphosphatosulfate compositions.

In addition various mixtures of phosphate and sulfate salts can be selected wherein the $M_2O:(P_2O_5+SO_3)$ molecular ratio will be less than one, e.g. sodium monohydrogen phosphate or sodium dihydrogen phosphate with sodium bisulfate, which on fusion of the dehydrated mixture gives a melt providing a polyphosphatosulfate composition when solidified.

All of the products having the same $Na_2O:P_2O_5:SO_3$ ratio are equivalent regardless of the specific phosphates, sulfates, or the acid anhydrides, phosphorus pentoxide or sulfur trioxide, which are employed to effect this ratio. Accordingly, it is apparent that a specific alkali metal polyphosphatosulfate composition can be prepared by the combination of various reactants pursuant to the aforesaid disclosure.

Suitable illustrative materials which can be employed to provide the necessary reactants, selected such that the ultimate molecular ratio of the $M_2O$ to the sum of the $P_2O_5$ and $SO_3$ is less than one, are: alkali metal monoxides, such as sodium monoxide and potassium monoxide; phosphorus pentoxide in all forms, the O-form polymeric material being preferred for reactions carried out in open vessels at atmospheric pressure; sulfur trioxide in all forms, but extra care must be employed in the use of $\alpha$-$SO_3$ since the melting of this stable form is accompanied by an almost explosive increase in vapor pressure, thus the $\gamma$-form is generally preferred; alkali metal sulfates such as sodium sulfate, potassium sulfate, sodium bisulfate, and potassium bisulfate; and alkali metal phosphates, such as trisodium orthophosphate, sodium monohydrogen orthophosphate, sodium dihydrogen orthophosphate, tetrasodium pyrophosphate, disodium dihydrogen pyrophosphate, sodium tripolyphosphate, sodium tetrapolyphosphate, the various sodium metaphosphates, and the like, and the corresponding potassium salts.

Various suitable combinations of reactants can be prepared and converted to the sodium polyphosphatosulfate compositions, as disclosed herein, according to the following illustrative table.

| $Na_2O:P_2O_5:SO_3$ | $\dfrac{Na_2O}{P_2O_5+SO_3}$ | Reactants |
|---|---|---|
| 4:3:5 | 0.50 | $2Na_4P_2O_7+P_2O_5+5SO_3$ |
| 4:3:5 | 0.50 | $8Na_5P_3O_{10}+3P_2O_5+5SO_3$ |
| 6:3:7 | 0.60 | $3Na_4P_2O_7+7SO_3$ |
| 6:3:7 | 0.60 | $2Na_5P_3O_{10}+NaSO_4+6SO_3$ |
| 5:3:5 | 0.63 | $5Na_2SO_4+3P_2O_5$ |
| 5:3:5 | 0.63 | $2Na_5P_3O_{10}+5SO_3$ |
| 8:3:8 | 0.73 | $3Na_4P_2O_7+2Na_2SO_4+6SO_3$ |
| 4:3:3 | 0.67 | $Na_4P_2O_7+6Na_2SO_4+5P_2O_5$ |
| 6:3:5 | 0.75 | $Na_4P_2O_7+10Na_2SO_4+2P_2O_5$ |
| 8:3:7 | 0.80 | $2Na_4P_2O_7+4Na_2SO_4+P_2O_5+3SO_3$ |
| 4:3:2 | 0.80 | $Na_4P_2O_7+2Na_2SO_4+2P_2O_5$ |
| 4:3:2 | 0.80 | $4Na_5P_3O_{10}+10Na_2SO_4+9P_2O_5$ |
| 6:3:4 | 0.86 | $Na_4P_2O_7+4Na_2SO_4+2P_2O_5$ |
| 8:3:6 | 0.89 | $4Na_3PO_4+18Na_2SO_4+7P_2O_5$ |
| 8:3:6 | 0.89 | $16Na_3PO_4+P_2O_5+18SO_3$ |

Similarly the corresponding potassium salts, and numerous other combinations can be employed.

To effect the formation of the polyphosphatosulfates of this invention it is essential that the mixture of selected reactants, preferably having been will mixed, is raised to a temperature which will convert the mixture to the liquid phase. This will require raising the temperature of the mixture to at least about 400° to about 450° C. The said mixture can be raised to the fusion point and then quickly chill cooled or it can be held in the molten condition for a short time, preferably not over about 15 minutes. When the composition is held in the molten condition for any substantial length of time it is desirable that the fusion vessel be closed and that the vapor space therein over the melted mixture should be relatively small in relation to the volume of the molten composition, especially when the composition contains a relatively large amount of $SO_3$, to preclude the loss of volatile components. Also a mixture of the selected phosphate and/or sulfate salts can be fused together and agitated in a closed vessel to which molten mixture sulfur trioxide and/or phosphorus pentoxide can be added as a vapor. Whereas the preparation of the polyphosphatosulfates can be readily effected at atmospheric pressure, as in a closed but vented vessel, it is desirable to employ a suitable superatmospheric pressure, as for example up to about 15 atmospheres or greater, particularly in those systems wherein the $SO_3$ content is realtively large.

The fusion product can be chill cooled by any suitable means, as for example, pouring the molten material by in a relatively thin layer into a series of large, shallow pans to provide a large, cooling surface, and said pans can be more rapidly cooled by placing in a tunnel to pass a cooling gas over the pans and/or flowing water under the pans; flowing the molten material in a thin film onto a rotary drum provided with a scraper knife and having a coolant circulating through the drum; by projecting the molten droplets in a cooling-air medium and providing a sufficient volume of cooling air for a given suspension time to effect solidification of the droplets before they reach the bottom of the spray chamber; and the like.

In order to distinguish between sulfur contained in the alkali metal polyphosphatosulfate and that present in the simple sodium sulfate salt a reliable means of analysis was necessary. Such a method was found by a modification of the ion exchange separation technique employed to characterize polyphosphates. In the analysis of phosphate mixtures the sample is placed on a Dowex-1 anion exchange resin (quaternary ammonium styrene-type resin) and subsequently eluted with a solution of potassium chloride, whereby the orthophosphate is very readily eluted, the polyphosphates through the tetrapolyphosphate are less readily eluted requiring the passing of substantially greater volumes of eluant through the resin bed, and long-chain or metaphosphates are not eluted. In the adaptation of this procedure to systems containing polyphosphatosulfates it was found that ionic sulfate, i.e. sulfate as present in sodium sulfate, was readily eluted from the sample in a similar manner to the elution of orthophosphate, whereas the sulfate tetrahedra present in the molecular structure of the inorganic heteropolymer composition was strongly held on the resin and could only be removed from the resin column after the hydrolysis of the polyphosphatosulfate by treatment thereof with warm hydrochloric acid.

The specific procedure employed to characterize the nature of the glassy products obtained as disclosed herein was to prepare a resin column 23 cm. long and 1.2 cm. in diameter containing 100- to 150-mesh Dowex 1–X10 anion exchange resin. An eluant solution containing 0.25 M KCl and 0.01 M $NH_4Cl$ was prepared and about 200 ml. thereof employed to equilibrate the resin column. Then a 50- to 100-mg. sample of the polyphosphatosulfate composition was dissolved in a minimum volume of 0.25 M potassium chloride solution, adjusted to a pH of from about 5 to about 7 with ammonium hydroxide, and added at the top of the resin column. The material thereafter was eluted from the resin with the aforesaid eluant solution at a flow rate of about 2.5 ml. per minute. A trace of orthophosphate and the ionic portion of the total sulfate present in the sample appear in the first 60 to 70 ml. of eluate and the removal of the ionic sulfate was complete at 120 ml. of eluant. The use of more than 900 ml. of eluate thereafter fails to elute the remaining phosphate and sulfate contained in the sample. Under these conditions the various phosphates would be eluated as follows: pyrophosphate in about 150 ml., tripolyphosphate in about 300 ml., and tetrapolyphosphate in about 400 ml.

Accordingly, in practice, the first about 140 ml. of eluate was taken for determination of ionic sulfate. This eluate fraction was acidified by the addition of about 5 ml. of concentrated hydrochloric acid and heated to the boiling point and sulfate was determined gravimetrically as barium sulfate in the usual manner.

After removal of the ionic sulfate in the first eluate fraction, the bound polyphosphatosulfate fraction was stripped from the resin by using warm 3 M hydrochloric acid as the eluant solution. It was determined that 100 ml. of warm 3 M hydrochloric acid followed by 50 ml. of distilled water was sufficient to remove all of the polyphosphatosulfate from the resin column. This eluate was evaporated to a volume of about 10 ml. to substantially reduce the quantity of hydrochloric acid present in the sample and thereafter the sample was diluted to about 100 ml. with distilled water. The sample was then heated to the boiling point and sulfate determined as indicated above.

Other suitable anion exchange resins can be employed, as for example Amberlite IRA–400 or Amberlite IRA–410, which are strongly basic, amine-type resins, Dowex 1–X4, Dowex 1–X8, and the like, but the above-disclosed procedure may require modification of the quantities of eluant solution employed for the various fractions, etc., which modifications can be readily determined by check determinations on known samples.

It has been found that the sulfur trioxide content of the alkali metal polyphosphatosulfate largely determines the acidity of the material in solution. Accordingly, this property is useful in characterizing these compositions whereby titration with a strong base such as sodium hydroxide is employed as a means of demonstrating the relative effect of increasing the sulfur trioxide content of the alkali metal polyphosphatosulfate composition. This titration has two end points, the first at pH 4.5 indicating the replacement of strong hydrogen and the second at pH 9.5 indicating the replacement of weak hydrogen. The relative acidity is expressed in terms of the moles of base per mole of the polyphosphatosulfate required to reach pH 4.5 and to raise the pH of the solution from 4.5 to 9.5.

As the ratio of the sulfur trioxide or sodium sulfate incorporated into the reaction mixture is increased it has been noted that an increasingly higher temperature is required to effect a clear melt. Those compositions wherein the ratio of sulfur trioxide or sodium sulfate employed is relatively small are clear glasses and are very brittle. As the aforesaid ratio increases the glass becomes increasingly opaque and the products are extremely hard.

The rate of hydrolysis of the polyphosphates is very small, for example, at about pH 3 to about pH 4, over a period of about 18 hours, whereas the rate of hydrolysis of the polysulfate bond is extremely rapid being substantially complete in a fraction of a second. It has been found that the relative stability of the novel compositions prepared as disclosed above is far greater than the polysulfates, but less than the polyphosphates which suggests the intermediate polyphosphatosulfate composition containing a P—O—S bond. Furthermore, as the relative SO₃ content of the polyphosphatosulfate composition is increased the composition becomes less stable, i.e. tends to more closely approach the physical properties of the polysulfates.

The series of alkali metal polyphosphatosulfate compositions have not yet been definitely established as to their precise structure, but there is substantial evidence to indicate the presence of the —P—O—S— grouping. It is believed that these compositions are primarily long-chain materials built up by repeating units such as (POPOSO)$_n$, (POPOPOSO)$_n$, (POPOPOPOPOSO)$_n$, and the like wherein $n$ is an integer up to about 100 or higher. There is also evidence that some of the products contain cross-linked chains and it is possible that a ring structure may be included in the series of compositions prepared by the fusion of mixtures wherein the molecular ratio of M₂O to the sum of the P₂O₅ plus SO₃ is less than one.

The instant invention is exemplified by the following illustrative examples:

Example 1

An equimolecular mixture of sodium bisulfate and sodium monohydrogen orthophosphate was gradually heated to about 450° C. over a period of about 30 minutes and then the fused material was chill cooled, pulverized, and analyzed by the above-disclosed ion exchange resin procedure. The reaction mixture was found to contain no sulfate as a portion of a polyphosphatosulfate composition, all of the sulfate in the system being accounted for as ionic sulfate. This reaction can be shown stepwise as follows:

(1)
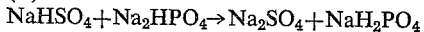
NaHSO₄+Na₂HPO₄→Na₂SO₄+NaH₂PO₄
(2)
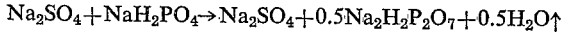
Na₂SO₄+NaH₂PO₄→Na₂SO₄+0.5Na₂H₂P₂O₇+0.5H₂O↑
(3)
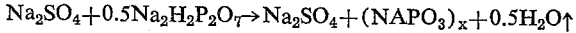
Na₂SO₄+0.5Na₂H₂P₂O₇→Na₂SO₄+(NAPO₃)$_x$+0.5H₂O↑

Thus the fusion products are sodium sulfate and sodium metaphosphate. It will be noted that Na₂SO₄ can be represented at Na₂O.SO₃ and NaPO₃ can be represented as Na₂O.P₂O₅, therefore the molecular ratio of the components 2Na₂O to the sum of P₂O₅ plus SO₃ would be one. It is apparent that since the ratio of Na₂O to the acid anhydride, P₂O₅ or SO₃, is unity for each of the materials Na₂SO₄ and NaPO₃ it would be impossible to effect any combination thereof which would permit a ratio of less than one to effect the formation of a polyphosphatosulfate. This was verified by the selection, for example, of a reaction mixture which contained three molecular equivalents of NaPO₃ per molecular equivalent of Na₂SO₄, wherein analysis showed that all of the sulfate was present as ionic sulfate.

Example 2

A mixture of 4 molecular equivalents of sodium bisulfate and 3 molecular equivalents of sodium monohydrogen orthophosphate were fused together at about 450° C. in a similar manner to that employed in Example 1. Also a mixture of 2 molecular equivalents of sodium bisulfate and 3 molecular equivalents of sodium dihydrogen orthophosphate were fused at about 450° C. in like manner. It will be seen that the ratios of these two experiments are 10Na₂O:3P₂O₅:8SO₃ and 5Na₂O:3P₂O₅:4SO₃, respectively, from which it will be seen that the ratio of Na₂O to the sum of P₂O₅ plus SO₃ is less than one in each case. Ion exchange resin determination of the reaction products of the dehydration and fusion of the aforesaid mixtures of acid salts clearly demonstrated the presence of the sodium polyphosphatosulfate composition since a substantial quantity of the total sulfate of the system was found to be present as combined sulfate.

Example 3

A sample of about 80 parts by weight of finely divided anhydrous sodium tripolyphosphate was placed in a shallow vessel and inserted into a furnace held at from about 350° to about 450° C. Gaseous sulfur trioxide was then passed through the furnace for a period of about 2 hours. The sulfur trioxide reacted with the sodium tripolyphosphate with the evolution of considerable additional heat and produced a fused product which on cooling was a glass. The cooled product had absorbed sulfur trioxide to the extent that the sodium tripolyphosphate had gained in weight by about 64 percent. This composition corresponds very closely to the ratio 5Na₂O:3P₂O₅:6SO₃. The sodium polyphosphatosulfate composition was characterized by a relative acidity of about 5.7 equivalents of sodium hydroxide per mole of sodium polyphosphatosulfate to pH 4.5 and an additional 2.2 equivalents from pH 4.5 to pH 9.5.

Example 4

A steam-jacketed, stainless steel, Baker-Perkins mixer fitted with a substantially gas-tight top and provided with a vent tube was charged with 3500 parts by weight of powdered anhydrous sodium tripolyphosphate. Then about 1145 parts by weight of liquid sulfur trioxide was slowly added thereto with constant agitation of the material in the mixer. The sulfur trioxide was added at a rate sufficiently slowly to preclude local overheating, which would otherwise cause a portion of the material to fuse, due to the heat of reaction, and coagulate into hard balls. The mixture was a free-flowing, dry powder, having little tendency to fume in contact with moist air. The material reacts vigorously with water in a manner similar to the acid anhydride, sulfur trioxide, and the aqueous sample thereof titrates as though it were a mixture of the original sodium tripolyphosphate and sulfuric acid.

The balance of the mixture was placed in a covered Vycor crucible and rapidly heated to a clear melt (about 450° C.), which molten material was chill cooled to provide a glass composition. It was found that this fusion product no longer reacts vigorously with water and had materially different properties than the reactants or the non-fused mixture thereof. This composition corresponds to the ratio 5Na₂O:3P₂O₅:3SO₃.

Example 5

A uniform mixture of tetrasodium pyrophosphate, sodium sulfate, and phosphorus pentoxide in the molecular equivalent ratio of 1:3:2 was prepared and heated at atmospheric pressure to a clear melt in a reaction vessel provided with a lid to reduce the loss of material by fuming. Then the clear melt was chill cooled and pulverized for analysis by the ion exchange procedure. It was found that over 50 percent of the sulfate introduced was present as combined sulfate. This composition corresponds to the ratio 5Na₂O:3P₂O₅:3SO₃.

A similar experiment to that above, but wherein the melt was effected in an open vessel which permitted loss of materials, since the reaction mixture was observed to fume strongly, was found to also contain combined sulfate, but in a substantially smaller amount than in the above experiment. Accordingly, it is apparent that the fusion reactions should be carried out in closed vessels to preclude substantial loss of materials.

It has been found that the alkali metal polyphosphatosulfate compositions are effective deflocculation agents, as for example in the treatment of clay and wet-process raw cement slurries. These novel compositions have the advantage over sodium tripolyphosphate in that they will readily deflocculate slurries which contain a relatively large amount of polyvalent metal ions, as for example materials containing soluble calcium or magnesium salts, without requiring that the slurry first be made alkaline and less of the alkali metal polyphosphatosulfate composition is required to effect a substantially reduced viscosity of the slurry than either sodium tripolyphosphate alone or in combination with sodium carbonate. Thus a high-calcium-ion content wet-process raw cement slurry containing about 64 percent total solids required 117 gm. weight to give a spindle speed of 300 r.p.m. in a Stormer viscosimeter and the addition thereto of 0.10 percent by weight of the slurry dry solids of sodium tripolyphosphate and the sodium polyphosphatosulfate composition, obtained by the fusion reaction of a mixture having the composition $5Na_2O:3P_2O_5:3SO_3$, respectively reduced the weight necessary to obtain the 300 r.p.m. rate of speed to 115 gm. and 88 gm., i.e. a 1.7 percent reduction for the slurry containing the sodium tripolyphosphate and a 24.8 percent reduction for the slurry containing the sodium polyphosphatosulfate composition. Further advantages of the sodium polyphosphatosulfate composition over the sodium tripolyphosphate composition is that it has less tendency to cause the deflocculated slurry to settle and can be filtered much more readily. Accordingly, the economic aspects of the cement production process requires that sodium tripolyphosphate can only be employed with raw cement slurries which are relatively low in polyvalent metal ions whereas the sodium polyphosphatosulfate composition can be readily employed over a wide range of cement slurry compositions. The method of increasing the fluidity of aqueous industrial mineral slurries with alkali metal polyphosphatosulfate compositions is disclosed and claimed in my copending application Serial No. 640,626, filed February 18, 1957, now U.S. Patent No. 2,900,266.

As a more direct measure of the relative chelation capacity of the sodium polyphosphatosulfate compositions the quantity of calcium ion necessary to cause turbidity in given samples was determined. The material to be tested was dissolved in distilled water (50 mg. sample/ about 75 ml. of water) and adjusted to pH 8. Then a 0.2 M solution of calcium chloride was added thereto from a buret and the first appearance of turbidity detected with the aid of a light beam passing through the sample. The "moles of calcium per mole of material" tested to give the first detectible turbidity, wherein the materials are compared on the same mole basis where a mole is that quantity of material equivalent to three moles of $P_2O_5$, was found to be as shown in the following table.

| Material | $\dfrac{Na_2O}{P_2O_5+SO_3}$ | Mole Calcium / Mole Material |
|---|---|---|
| Graham Salt ($n=64$) | 1.00 | 3 |
| Sodium tripolyphosphate | 1.67 | 3 |
| Sodium polyphosphatosulfate: | | |
| 5 $Na_2O$:3 $P_2O_5$:4.5$SO_3$ | 0.67 | 13 |
| 5 $Na_2O$:3 $P_2O_5$:5$SO_3$ | 0.63 | 14 |
| 6 $Na_2O$:3 $P_2O_5$:5$SO_3$ | 0.75 | 27 |
| 6 $Na_2O$:3 $P_2O_5$:4$SO_3$ | 0.86 | 80 |
| 3.3 $Na_2O$:3 $P_2O_5$:1$SO_3$ | 0.83 | >80 |

I claim:
1. A composition of matter comprising the alkali metal polyphosphatosulfates defined by the formula

$$xM_2O:yP_2O_5:zSO_3$$

wherein M is an alkali metal selected from the group consisting of sodium and potassium, and $x$, $y$ and $z$ are positive integers, wherein the ratio of $x$ to the sum of $y$ plus $z$ is at least about 0.4 but less than one and characterized by the predominately repeating structural unit

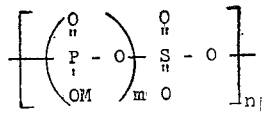

wherein $n$ is a positive integer and $m$ is a number greater than one.

2. The composition of matter of claim 1, wherein the ratio of $x$ to the sum of $y$ plus $z$ is from about 0.55 to about 0.9.

3. The composition of matter of claim 2, wherein M is sodium.

4. The composition of matter of claim 2, wherein M is potassium.

5. The method of preparing an alkali metal polyphosphatosulfate composition comprising effecting a mixture of at least one member from the group consisting of an alkali metal monoxide, an alkali metal phosphate and an alkali metal sulfate, and at least one member from the group consisting of the acid anhydrides phosphorus pentoxide and sulfur trioxide, such that said mixture on elimination of any water of crystallization and molecularly bound water as defined by the combination of cationic and anionic oxides conforms to the formula $$xM_2O:yP_2O_5:zSO_3$$

wherein M is an alkali metal selected from the group consisting of sodium and potassium, and $x$, $y$ and $z$ are positive integers, wherein the ratio of $x$ to the sum of $y$ plus $z$ is at least about 0.4 but less than one; heating the mixture to the melting point thereof; and chill cooling the molten reaction product.

6. The method of claim 5, wherein the ratio of $x$ to the sum of $y$ plus $z$ is from about 0.55 to about 0.9.

7. The method of claim 6, wherein M is sodium.

8. The method of claim 6, wherein M is potassium.

9. The method of preparing a sodium polyphosphatosulfate composition comprising contacting gaseous sulfur trioxide with anhydrous sodium tripolyphosphate to absorb from about 1.25 to about 3 moles of sulfur trioxide per mole of sodium tripolyphosphate, corresponding to a ratio of $Na_2O$ to the sum $P_2O_5$ plus $SO_3$ of from about 0.555 to about 0.908, in a closed reaction vessel, effecting fusion of the aforesaid mixture, and subsequently chill cooling the fusion mass.

10. The method of claim 9, wherein from about 1.5 to about 2.5 moles of sulfur trioxide are absorbed per mole of sodium tripolyphosphate, corresponding to a ratio of $Na_2O$ to the sum of $P_2O_5$ plus $SO_3$ of from about 0.625 to about 0.908.

11. The method of claim 10, wherein about 1.5 moles of sulfur trioxide are absorbed per mole of sodium tripolyphosphate, corresponding to a ratio of $Na_2O$ to the sum of $P_2O_5$ and $SO_3$ of about 0.833, and the mixture thereof is heated to about 450° C. and then chill cooled.

12. The method of preparing a sodium polyphosphatosulfate composition comprising the addition of from about 1.25 to about 3 moles of liquid sulfur trioxide per mole of powdered anhydrous sodium tripolyphosphate, corresponding to a ratio of $Na_2O$ to the sum $P_2O_5$ plus $SO_3$ of from about 0.555 to about 0.908, in a substantially gas-tight mixer, wherein the sulfur trioxide is added to the agitated sodium tripolyphosphate to provide a free-flowing, dry powder, which mixture is subsequently heated to the fusion point and the molten reaction product is then chill cooled.

13. The method of claim 12, wherein from about 1.5 to about 2.5 moles of sulfur trioxide are added per mole of sodium tripolyphosphate, corresponding to a ratio of $Na_2O$ to the sum of $P_2O_5$ plus $SO_3$ of from about 0.625 to about 0.908.

14. The method of claim 13, wherein about 1.5 moles of sulfur trioxide are added per mole of sodium tripolyphosphate, corresponding to a ratio of $Na_2O$ to the sum of $P_2O_5$ and $SO_3$ of about 0.833, and the mixture thereof is heated to a clear melt at about 450° C. and then chill cooled.

15. The method of preparing a sodium polyphosphatosulfate composition comprising effecting a substantially uniform mixture of a sodium phosphate, sodium sulfate, and phosphorus pentoxide, said mixture conforming to the formula $xNa_2O:yP_2O_5:zSO_3$ wherein $x$, $y$ and $z$ are positive integers and the ratio of $x$ to the sum of $y$ plus $z$ is from about 0.55 to about 0.9, heating said mixture to the fusion point thereof and then chill cooling the molten reaction product.

16. The method of preparing a sodium polyphosphatosulfate composition comprising effecting a substantially uniform mixture of the substantially anhydrous materials tetrasodium pyrophosphate, sodium sulfate and phosphorus pentoxide in the molecular ratio of about 1:3:2, heating said mixture to the fusion point to a clear melt and thereafter chill cooling the fusion product.

17. The method of preparing a sodium polyphosphatosulfate composition comprising effecting a substantially uniform mixture of the substantially anhydrous materials tetrasodium pyrophosphate, sodium sulfate and phosphorus pentoxide in the molecular ratio of about 1:2:2, heating said mixture to the fusion point to a clear melt and thereafter chill cooling the fusion product.

18. The method of preparing a sodium polyphosphatosulfate composition comprising effecting a substantially uniform mixture of the substantially anhydrous materials tetrasodium pyrophosphate, sodium sulfate and phosphorus pentoxide in the molecular ratio of about 1:6:5, heating said mixture to the fusion point to a clear melt and thereafter chill cooling the fusion product.

19. The method of preparing an alkali metal polyphosphatosulfate composition comprising heating a mixture of materials providing $xM_2O$, wherein M is an alkali metal selected from the group consisting of sodium and potassium, $yP_2O_5$ and $zSO_3$, wherein $x$, $y$ and $z$ are positive integers, in a mole ratio of $M_2O$ to the sum of $P_2O_5$ plus $SO_3$ of at least about 0.4, but less than one, to above the melting point of the said mixture and then chill cooling the molten reaction product.

20. The method of claim 19, wherein the mole ratio of $M_2O$ to the sum of $P_2O_5$ plus $SO_3$ is from about 0.55 to about 0.9.

References Cited in the file of this patent
UNITED STATES PATENTS

| | | |
|---|---|---|
| 2,174,614 | Bornemann et al. | Oct. 3, 1939 |
| 2,288,418 | Partridge | June 30, 1942 |
| 2,291,958 | Garrison | Aug. 4, 1942 |
| 2,493,809 | Garrison | Jan. 10, 1950 |
| 2,668,147 | Blaser et al. | Feb. 2, 1954 |